United States Patent

Kiri et al.

[11] Patent Number: 6,154,253
[45] Date of Patent: *Nov. 28, 2000

[54] OBJECT DETECTION MECHANISM FOR IMAGING DEVICES WITH AUTOMATIC FOCUSING

[75] Inventors: Manabu Kiri, Machida; Toshiki Miyano, Yokohama; Kyoichi Omata, Tanashi, all of Japan

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/736,639

[22] Filed: Oct. 24, 1996

[30] Foreign Application Priority Data

Feb. 6, 1996 [JP] Japan ................................. 8-019677

[51] Int. Cl.$^7$ ................................................. G03B 13/00
[52] U.S. Cl. ........................... 348/345; 348/348; 348/350
[58] Field of Search .................................... 348/345, 348, 348/349, 350, 341, 353, 354, 355, 356, 347; 396/121, 123, 80, 81, 82, 104

[56] References Cited

U.S. PATENT DOCUMENTS

| 4,853,788 | 8/1989 | Murashima et al. | 348/356 |
| 4,868,666 | 9/1989 | Azumi et al. | 348/348 |
| 4,924,247 | 5/1990 | Suzuki et al. | 348/348 |
| 5,003,339 | 3/1991 | Kikuchi et al. | 348/347 |
| 5,055,933 | 10/1991 | Hidaka | 348/356 |
| 5,561,497 | 10/1996 | Muramatsu et al. | 396/121 |
| 5,640,613 | 6/1997 | Yuyama et al. | 348/341 |
| 5,715,483 | 2/1998 | Omata et al. | 396/80 |

*Primary Examiner*—Wendy Garber
*Assistant Examiner*—Luong Nguyen
*Attorney, Agent, or Firm*—Pamela R. Crocker

[57] ABSTRACT

The focusing lens serves to focus an image on a CCD. The image is displayed in a view finder through a different optical axis. A focus evaluation area determining circuit establishes a plurality of preset focus evaluation areas for the respective object distances on the basis of the axis offset between the optical axes of the focusing lens and the view finder. The corresponding preset object distance is compared with the object distance measured for the focus evaluation area in an object detection circuit. The result of the comparison allows the detection of an object specified in the view finder.

11 Claims, 4 Drawing Sheets

OBJECT DETECTION MECHANISM FOR IMAGING DEVICES WITH AUTOMATIC FOCUSING

FIELD OF THE INVENTION

The present invention relates to an object detection mechanism in imaging devices such as electronic still cameras with automatic focusing, in particular, to an object detection mechanism employed in imaging devices comprising a first optical system for focusing an image on a predetermined plane with a focusing lens, a second optical system for displaying the image in a view finder through an optical axis different from that of the first optical system, and a focus evaluator for evaluating the focusing degree of an object in the image based on an image screen displayed through the first optical system.

BACKGROUND OF THE INVENTION

A camera may have an axis offset between an optical axis of an image pick-up optical system as a first optical system for focusing an image on a photoelectric detector with a focusing lens and an optical axis of a second optical system for displaying the image in a view finder an operator looks into. This camera cannot avoid parallax. Unless the object is located at a point called a crossover point COP, there is a positional deviation between the image seen through the view finder and the image actually picked up as shown in FIG. 5A. For example, assuming that an operator attempts to pick up the image of an object X in front of the crossover point COP as shown in FIG. 5B. When the object X is captured at the center of the view finder as shown in FIG. 6A, the object X positions offset to the right on the image screen as shown in FIG. 6B. On the other hand, in case of imaging an object Y far behind the crossover point COP as shown in FIG. 5C, the object Y positions offset to the left as shown in FIG. 7B when the object Y is captured at the center of the view finder as shown in FIG. 7A.

With a camera with parallax, even if an operator attempts to focus an object by capturing the object at the center of a view finder, the parallax causes the object to move out of a focus evaluation area at the center of the image screen formed through the image pick-up optical system, making it impossible to focus the object.

A prior art camera employs an evaluation window, which is capable of moving in a screen formed in a view finder in response to variation of the object distance, in order to avoid parallax. The evaluation window defines the window for an object to be focused. However, an automatic focusing camera with a zoom lens requires the movement of such window or evaluation window on the basis of the variation in not only object distance but also focal length or zoom magnification. This leads to a complicated mechanism for evaluation window movement.

For simplicity the mechanism may employ two stationary evaluation windows for an infinite imaging and a nearest imaging with the largest zoom magnification in an image screen formed in a view finder. However, with this facilitated method, an operator cannot determine the center position of the image screen at various zoom magnification and object distances. Attempts by an operator to focus thereby lead to blurred images.

SUMMARY OF THE INVENTION

An object of the present invention is accordingly to provide an object detection mechanism in an imaging device with automatic focusing, which mechanism is capable of reliably detecting an object to be focused with a simple structure.

According to the present invention, there is provided an imaging device with automatic focusing, comprising: a first optical system capable of focusing an image on a predetermined plane with a focusing lens; a second optical system capable of displaying the image in a view finder through an optical axis different from that of the first optical system; a focus evaluator capable of evaluating the focusing degree of an object in the image based on an image screen displayed through the first optical system; distance measuring means capable of measuring the object distance for a plurality of focus evaluation areas in the image screen; and object detection means capable of extracting in the image screen the object located at the center of the view finder by comparing the object distance with predetermined object distances set for the respective focus evaluation areas on the basis of an axis offset between the first and second optical systems.

The axis offset between the first and second optical systems can be previously specified. The axis offset must cause the offset of an object in the image screen through the first optical system. Therefore, the measurement of the object distance of the image in the image screen through the first optical system enables the detection of the object which an operator selects through the second optical system.

BRIEF DESCRIPTION OF THE DRAWINGS

The above and other objects, features and advantages will be apparent from the following detailed description taken in conjunction with the accompanying drawings, wherein.

DETAILED DESCRIPTION OF THE INVENTION

Figure 1:
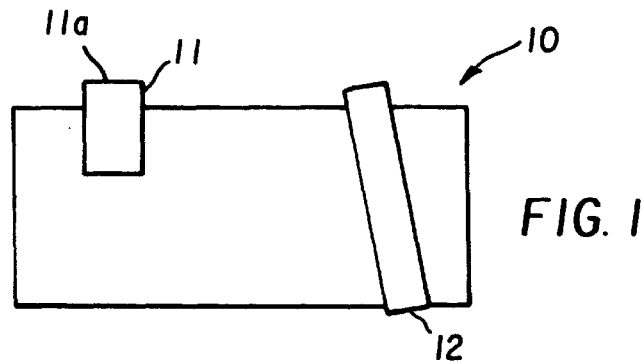
FIG. 1 illustrates a plan view of an imaging device with automatic focusing.
Figure 5C:
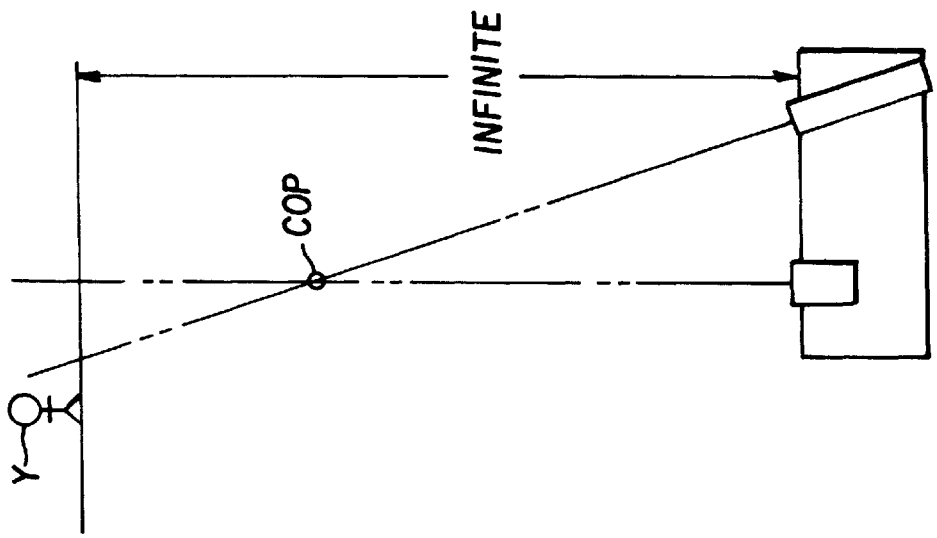
FIGS. 5A–5C illustrate the optical axis offset between the first and second optical systems.

FIG. 1 illustrates an overall structure of an imaging device with automatic focusing employing an object detection mechanism according to the present invention. The imaging device with automatic focusing 10 can be an electronic still camera and comprises: a zoom lens 11 including a focusing lens 11a constituting a first optical system for focusing a preferable image on a predetermined plane, and a view finder 12 for displaying the image through a second optical system having an optical path different from that of the first optical system. The optical axis of the focusing lens 11a intersects the optical axis of the view finder 12 at the crossover point COP as shown in FIG. 5A.

Figure 2:
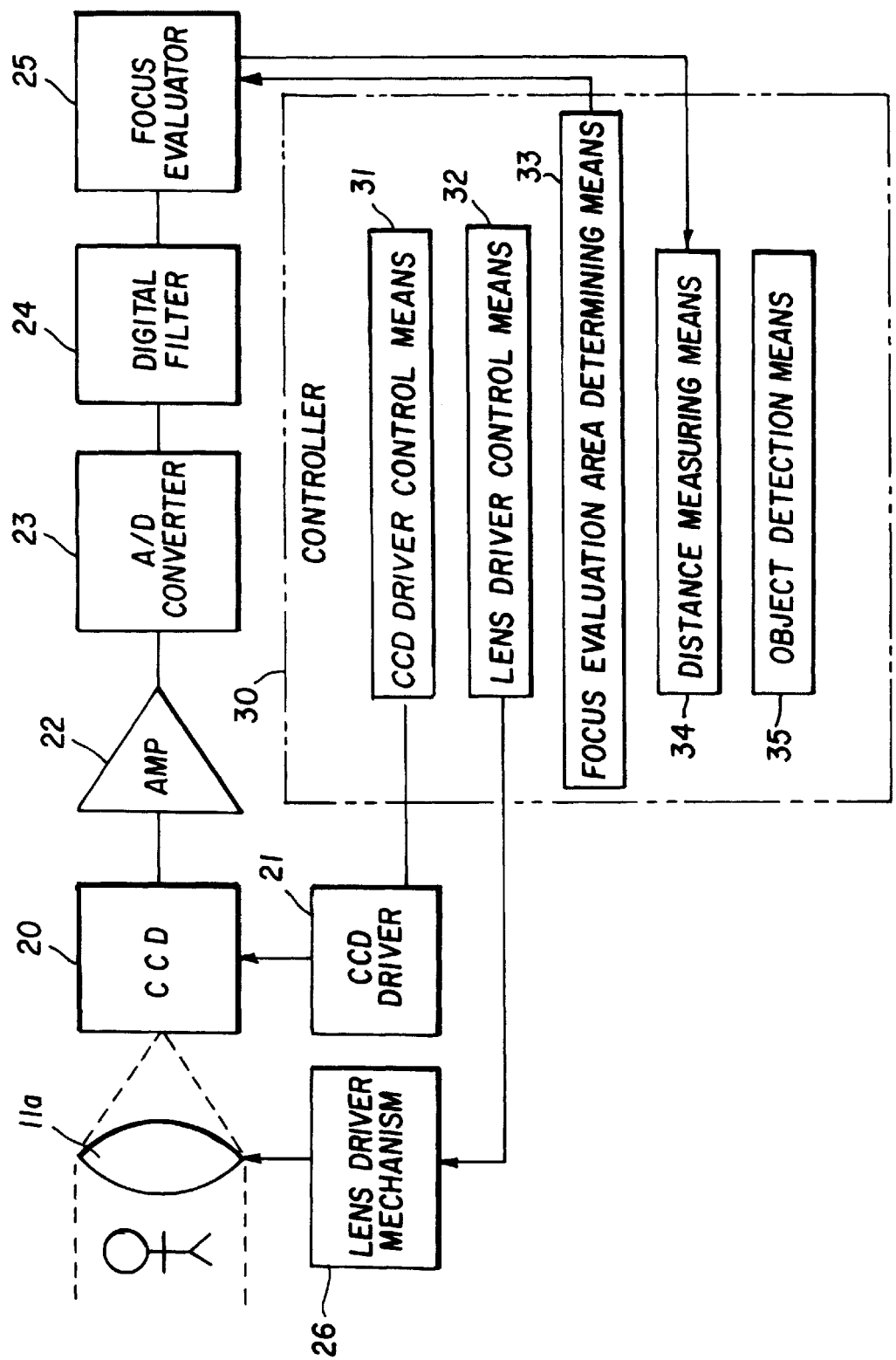
FIG. 2 illustrates a block diagram of the imaging device with automatic focusing.

FIG. 2 illustrates a block diagram of the imaging device 10. The imaging device 10 comprises a CCD 20 as a photoelectric detector for outputting an analog signal corresponding to the illuminance of respective dots based on the image focused by the focusing lens 11a. The CCD 20 outputs a serial signal sequence for each dot over the whole image screen in response to a drive signal supplied from a CCD driver 21. An analog signal output from the CCD 20 is amplified by an amplifier 22 for gain adjustment. The analog signal, subjected to gain adjustment, is supplied to an A/D converter 23 which converts an analog signal into a digital signal. A digital filter 24 extracts the high frequency component from the digital signal so as to supply the component to a focus evaluator 25. The focus evaluator 25, based on the magnitude of the high frequency component, evaluates the focusing degree of an object included in the image.

A controller 30 includes a CCD driver control means 31 for controlling the output of a drive signal in the CCD driver 21 and a lens driver control means 32 for controlling a lens driver mechanism 26 based on the focus evaluation value supplied from the focus evaluator 25. The controller 30 moves the focusing lens 11a by controlling the lens driver mechanism 26, thereby positioning the focusing lens 11a at a lens position allowing the maximum focus evaluation value.

Figure 3:
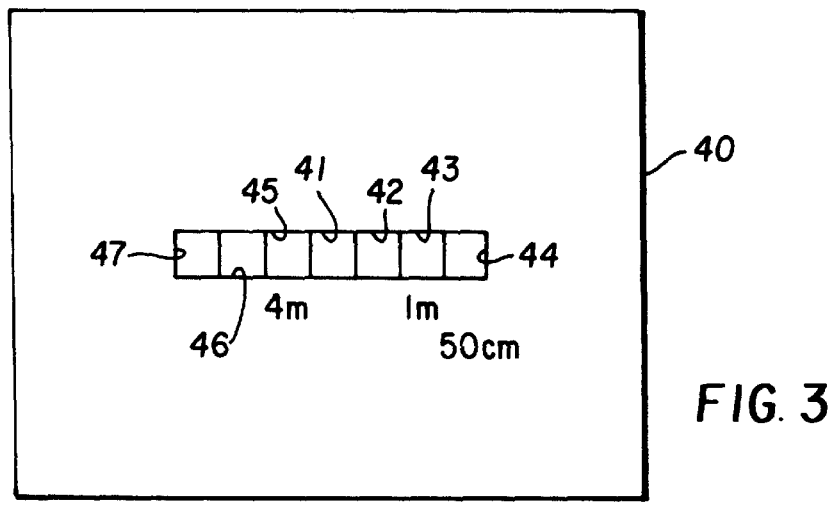
FIG. 3 illustrates an image screen through a first optical system.

The controller 30 further includes a focus evaluation area determining means 33 for establishing a plurality of predetermined focus evaluation areas which are related to predetermined object distances based on the axis offset between the first and second optical systems (the magnification of 200 mm in case of a zoom lens). The focus evaluation area determining means 33, for example as shown in FIG. 3, establishes a plurality of focus evaluation areas, corresponding to the respective object distances, for the focus evaluator 25 when an object is captured at the center of the view finder 12. The focus evaluation areas can specify the position of an object appearing in the image plane of the first optical system as additionally shown in FIGS. 5B and 5C. The focus evaluation areas are arranged on a plane including two optical axes of the first and second optical systems. For example, in this embodiment, a focus evaluation area 41 for a crossover point is established at the center of the image screen 40 for displaying an object located at the crossover point COP when such object is captured at the center of the view finder 12. Adjacent one side of the focus evaluation area 41 for a crossover point, focus evaluation areas 42, 43, 44 for 2 m, 1 m and 50 cm object distances are respectively defined for sequentially displaying an object which approaches in front of the crossover point COP. Adjacent the other side of the focus evaluation area 41 for a crossover point COP, focus evaluation areas 45, 46, 47 for 4 m, 5 m and infinite object distances are respectively defined for sequentially displaying an object which retreats behind the crossover point COP. When the controller 30 sets the focus evaluation areas 41 to 47, the focus evaluator 25 counts the digital signal for the respective focus evaluation areas 41 to 47 so as to calculate the focus evaluation values for the respective focus evaluation areas 41 to 47 identified by the counting. Note that the size and position of the respective focus evaluation areas 41 to 47 can be set depending upon the zoom magnification of the zoom lens 11.

A distance measuring means 34 of the controller 30 measures the object distances for a plurality of images of the focus evaluation areas 41 to 47. The distance measuring means 34 assumes that the images in the focus evaluation areas 41 to 47 are an object irrespective of whether the respective images are a target object or not and measures the object distance for the respective focus evaluation areas 41 to 47. An object detection means 35 compares the object distance obtained in the distance measuring means 34 with a predetermined object distance previously set for each of the focus evaluation areas 41 to 47. If the obtained object distance is matched with the predetermined object distance, the object detection means 35 extracts on the image screen 40 an object at the center of the view finder 12.

The operation of this embodiment will next be described. First of all, when the shutter (not shown) starts a focusing operation, the focus evaluation area determining means 33 establishes on the image screen 40 of the focus evaluator 25 the focus evaluation areas 41 to 47 of a proper size at proper positions depending on the magnification of the zoom lens 11. Subsequently, the lens driver control means 32 controls the lens driver 26 to displace the focusing lens 11a from the nearest point to the infinite point. During the movement of the focusing lens 11a, the CCD 20 picks up a plurality of images at pick-up points of larger intervals. Each time an image is picked up, the focus evaluator 25 calculates the high frequency component or focus evaluation value for the respective focus evaluation areas 41 to 47.

The distance measuring means 34 of the controller 30 specifies, for the respective focus evaluation areas 41 to 47, a lens position of the focusing lens 11a allowing the maximum focus evaluation value, that is, a lens position of focusing an image. This lens position serves to determine the object distance. The relationship between the position of the focusing lens 11a and the object distance is preset.

Figure 4:
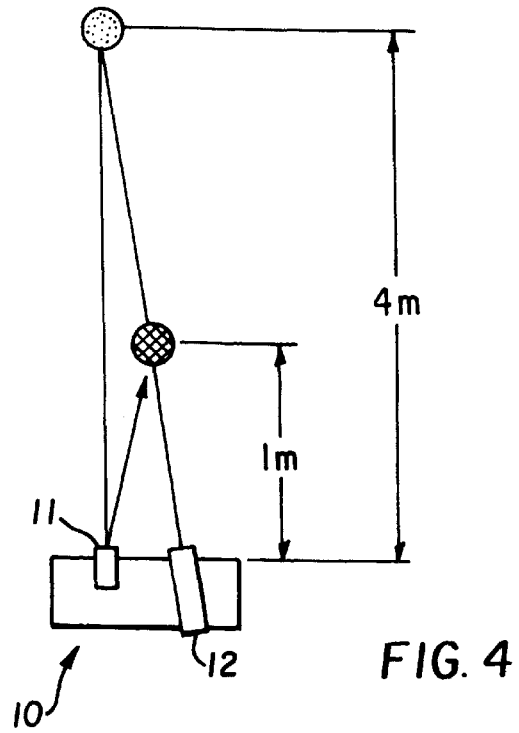
FIG. 4 is an illustration for explaining the operation of an object detection means.

The object detection means 35 specifies the focus evaluation area 41 to 47 allowing the coincidence between the object distance previously set for the focus evaluation area 41 to 47 and the object distance measured in the distance measuring means 34. An image displayed in the focus evaluation area 41 to 47 specified by the object detection means 35 is selected as an object captured at the center of the view finder 12. As shown in FIG. 4, the coincidence can be established in a plurality of focus evaluation areas 43, 45 in the case where two object locate one behind the other in the view finder 12. In this case, an object nearer to the camera is focused with a priority.

The lens driver control means 32 then moves the focusing lens 11a so as to pick up a plurality of images at pick-up points of shorter intervals. Fine focusing is achieved.

Figure 5B:
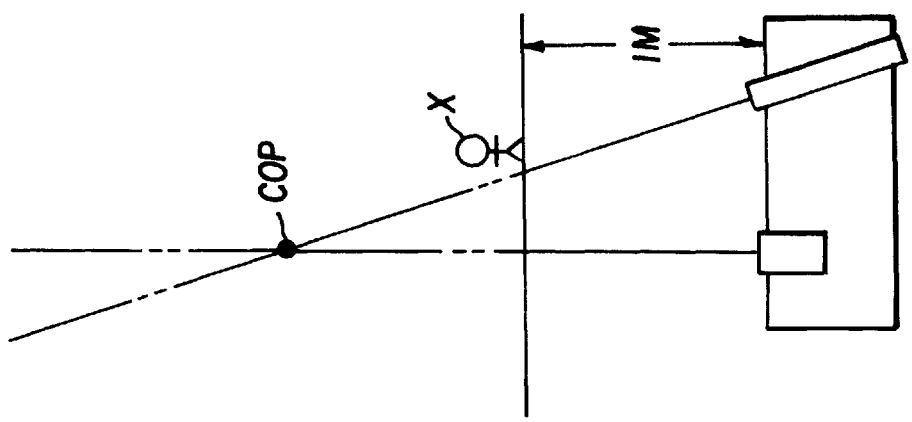
Figure 5A:
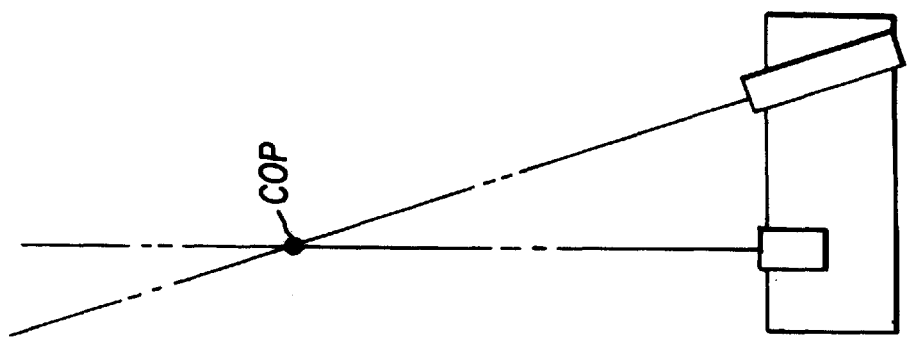
Figure 6A:
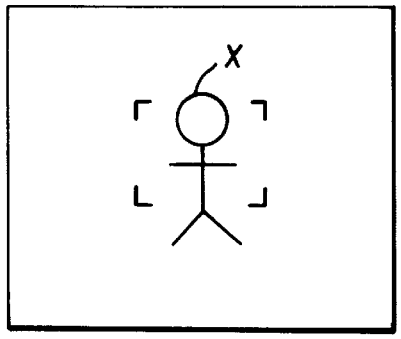
FIGS. 6A–6B illustrate the difference between the image screen and the view finder based on the axis offset.
Figure 6B:
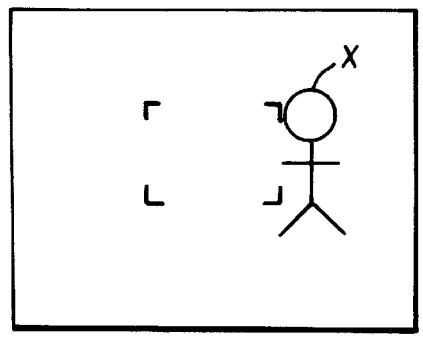
Figure 7A:
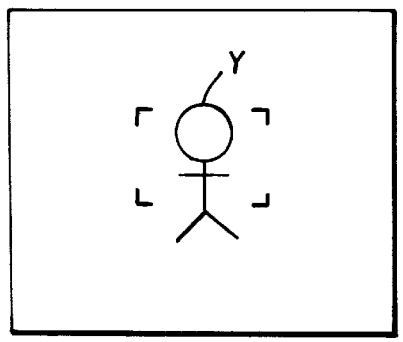
FIGS. 7A–7B illustrate the difference between the image screen and the view finder based on the axis offset.
Figure 7B:
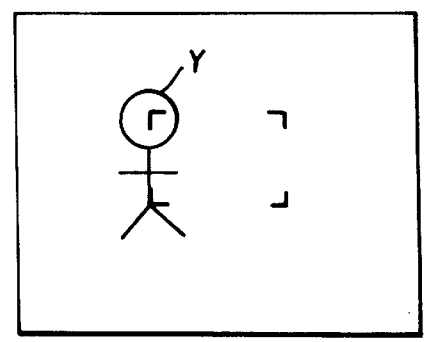

Assume that an operator attempts to pick up the image of an object located 1 m from the camera as shown in FIG. 5B. An object X is captured at the center of the view finder 12 with an infinite background. The measurement of the object distance for the respective focus evaluation areas 41 to 47 reveals the coincidence of the two object distances in the focus evaluation area 43, 47 for 1 m and infinite object distances.

Focusing based on the object in the focus evaluation area 43 for 1 m object distance, in which the object is nearer to the camera, leads to an object focusing which the operator actually selects. Assume that an operator attempts to pick up the image of an object located at infinity as shown in FIG. 5C. An object Y is captured at the center of the view finder 12. The measurement of the object distance for the respective focus evaluation areas 41 to 47 reveals the coincidence of two object distances in the focus evaluation area 47 for an infinite object distance. An object Y at infinity can thus be focused in the camera as desired.

It should be noted that measurement of the object distance by infrared or ultrasonic waves may be employed in place of measurement by a high frequency component. In these methods, an infrared or ultrasonic wave may be directed to respective positions set depending on the axis offset.

What is claimed is:

1. An imaging device with automatic focusing, comprising:

a first optical system that focuses a first image of an object on an image plane with a focusing lens along a first fixed optical axis at a plurality of focusing intervals;

a second optical system which displays a second image of the object in a view finder through a second fixed optical axis, wherein the second fixed optical axis intersects the first fixed optical axis at a crossover point;

a focus evaluation area determining means that generates a plurality of predetermined focus evaluation areas corresponding to predetermined object distances which are based on an axis offset between the first optical system and the second optical system;

a focus evaluator that generates focus evaluation values for each of the focus evaluation areas at the plurality of focusing intervals;

a distance measuring means that generates a measured object distance for each of the focus evaluation areas at each focusing interval based on the focus evaluation values;

an object detection means that compares the measured object distance to the predetermined object distance set for each focus evaluation area and establishes object coincidence when the measured object distance equals the predetermined object distance.

2. The imaging device of claim 1, wherein the first optical system includes a solid state sensor located at the image plane.

3. The imaging device of claim 1, wherein the first optical system includes a zoom lens.

4. The imaging device of claim 3, wherein the size and position of the focus evaluation areas are set depending upon a zoom lens magnification of the zoom lens.

5. The imaging device of claim 1, wherein the focus evaluator calculates the high-frequency components of the plurality of focus evaluation areas.

6. The imaging device of claim 1, wherein a focus evaluation area for the crossover point that corresponds with a center of the view finder is defined from the plurality of focus evaluation areas.

7. The imaging device of claim 1, wherein focus evaluation areas adjacent one side of the focus evaluation area for the crossover point are defined for object distances in front of the crossover point and focus evaluation areas adjacent a second side of the focus evaluation area for the crossover point are defined for object distances past the crossover point.

8. The imaging device of claim 1, wherein the object detection means selects the object nearer to the imaging device when a plurality of objects are located one behind the other along the second optical axis and coincidence is established for a plurality of focus evaluation areas.

9. An imaging device with automatic focusing, comprising:

a first optical system that focuses a first image of an object on an image plane with a focusing lens along a first fixed optical axis at a plurality of focusing intervals;

a second optical system which displays a second image of the object in a view finder through a second fixed optical axis, wherein the second fixed optical axis intersects the first fixed optical axis at a crossover point;

a focus evaluation area determining means that generates a plurality of predetermined focus evaluation areas corresponding to predetermined object distances which are based on an axis offset between the first optical system and the second optical system;

a focus evaluator that generates focus evaluation values for each of the focus evaluation areas at the plurality of focusing intervals;

means for controlling the selection of a correct focus for the imaging device based on the focus evaluation values when the object is centered in the view finder.

10. The imaging device of claim 9, wherein the focus evaluator calculates the high-frequency components of the plurality of focus evaluation areas.

11. The imaging device of claim 10, wherein the size and position of the focus evaluation areas are set depending upon a zoom lens magnification of a zoom lens of the first optical system.

* * * * *